(12) United States Patent
Shammout

(10) Patent No.: US 6,224,131 B1
(45) Date of Patent: May 1, 2001

(54) REACTIVE SEAT SYSTEM

(76) Inventor: Mohammad Shammout, P.O. Box 178810, San Diego, CA (US) 92177

(*) Notice: Subject to any disclaimer, the term of this patent is extended or adjusted under 35 U.S.C. 154(b) by 0 days.

(21) Appl. No.: 09/401,008

(22) Filed: Sep. 21, 1999

(51) Int. Cl.[7] .................................................. B60N 2/02
(52) U.S. Cl. ..................................... 296/68.1; 297/216.18
(58) Field of Search ....................... 296/68.1; 297/216.1, 297/216.16, 216.18

(56) References Cited

U.S. PATENT DOCUMENTS

| | | | |
|---|---|---|---|
| 3,858,930 | * | 1/1975 | Calandra et al. . |
| 3,992,046 | * | 11/1976 | Braess . |
| 4,152,025 | | 5/1979 | Bendler et al. ....................... 297/386 |
| 4,733,845 | | 3/1988 | Maiwald ............................... 248/429 |
| 4,982,916 | | 1/1991 | Dupont et al. .................. 244/122 AF |
| 5,344,204 | * | 9/1994 | Liu . |
| 5,777,225 | | 7/1998 | Sada et al. ............................... 73/488 |
| 5,793,005 | | 8/1998 | Kato ............................... 200/61.45 R |
| 5,826,901 | | 10/1998 | Adomeit ............................ 280/728.2 |
| 5,847,315 | | 12/1998 | Katzakian, Jr. et al. ......... 149/19.91 |
| 5,911,440 | | 6/1999 | Ruddick et al. ..................... 280/806 |
| 5,947,543 | * | 9/1999 | Hubbard . |

FOREIGN PATENT DOCUMENTS 2 233 829 * 1/1975 (FR) .
711561 * 7/1966 (IT) .

* cited by examiner

Primary Examiner—D. Glenn Dayoan
Assistant Examiner—Scott Carpenter
(74) Attorney, Agent, or Firm—Freling E. Baker; Baker & Maxham

(57) ABSTRACT

An apparatus configured to move a vehicle seat away from a vehicle dashboard during or immediately prior to a collision. The apparatus comprises a vehicle seat coupled to a slideable platform. A vehicle collision detector communicates with the slideable platform so that when a vehicle collision condition is detected the slideable platform is triggered to move the vehicle seat.

12 Claims, 3 Drawing Sheets

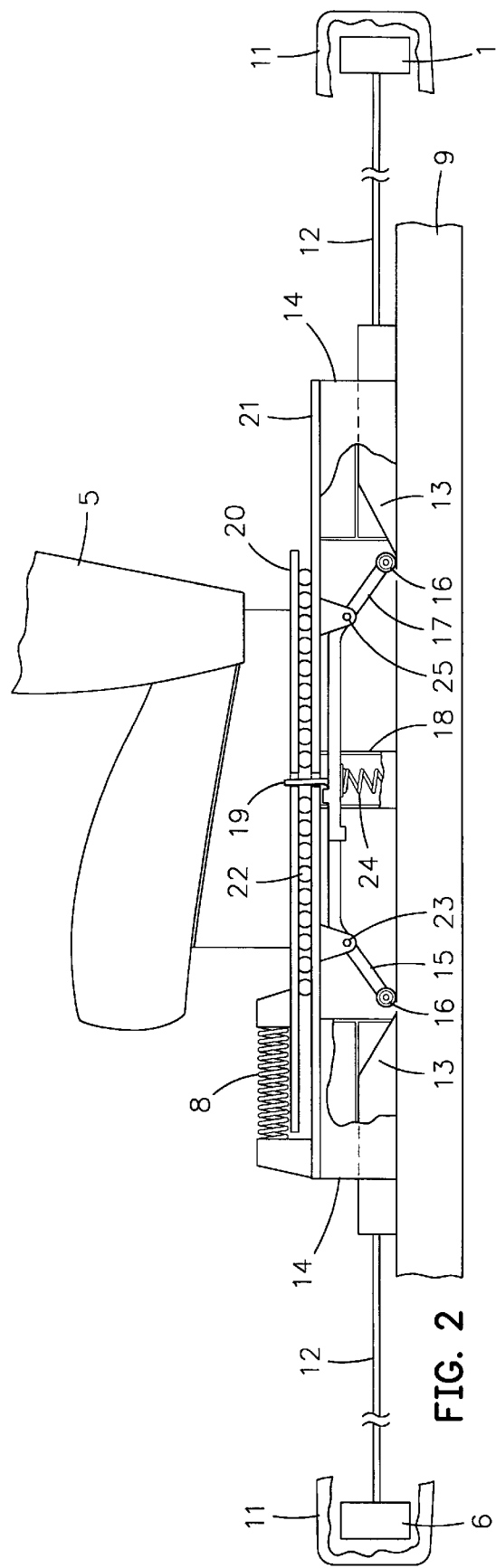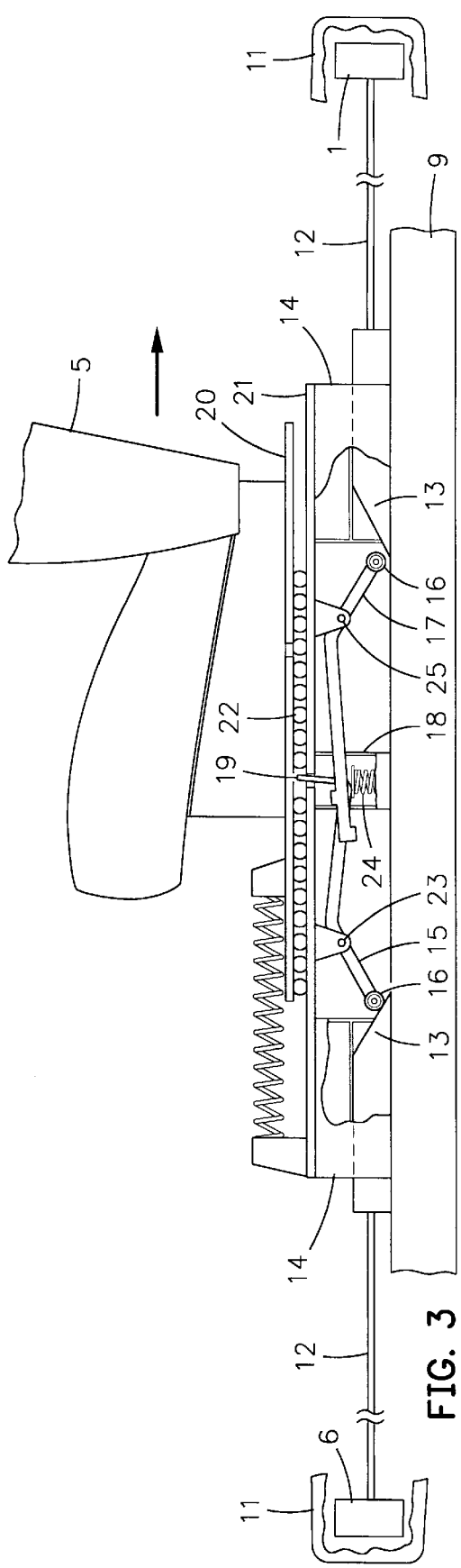

REACTIVE SEAT SYSTEM

BACKGROUND OF THE INVENTION

1. Field of the Invention

The present invention generally relates to vehicle safety systems. More particularly, the invention concerns a method and apparatus to move a vehicle seat in response to a collision or imminent collision.

2. Discussion of the Related Art

Many thousands of vehicle occupants are injured and killed every year in vehicle collisions or accidents. A variety of devices and systems have been integrated into vehicles in an effort to increase vehicle safety. These include seat belts, airbags, collapsible steering wheel columns and other features.

However, even with these safety devices vehicle occupants are still injured by striking the vehicle interior, especially the vehicle dashboard. In addition, the explosive force used to deploy airbags injures many vehicle occupants.

Airbag systems are being modified in an attempt to minimize or eliminate the injuries and deaths caused by vehicle airbag deployments. Still, children and other occupants that position themselves in close proximity to the steering wheel or dashboard will always be at risk of injury from striking the dashboard and from airbag deployments.

SUMMARY OF THE INVENTION

The present invention can help minimize vehicle occupant injuries sustained by striking vehicle interiors, especially dashboards, and injuries associated with explosive airbag deployments when the occupant is too close to the airbag.

Broadly, the present invention provides a method for moving a vehicle occupant away from the dashboard and airbag. More specifically, one embodiment of the invention provides a vehicle with a vehicle seat, where the vehicle seat is coupled to a moving element, and a vehicle collision detector. The vehicle collision detector detects a vehicle collision condition—an actual collision or an imminent collision—and triggers the vehicle seat moving element to move the vehicle seat. In a preferred embodiment of the present invention, the vehicle seat is moved by a spring in response to a collision impacting the front of the automobile.

However, the claims alone—not the preceding summary—define the invention.

BRIEF DESCRIPTION OF THE DRAWINGS

The nature, goals, and advantages of the invention will become more apparent to those skilled in the art after considering the following detailed description when read in connection with the accompanying drawing—illustrating by way of examples several embodiments in accordance with the present invention—in which like reference numerals identify like elements throughout wherein:

FIG. 2 is an elevation view of the reactive seat system illustrated in FIG. 1, shown in a before-activation position;

FIG. 3 is an elevation view of the reactive seat system illustrated in FIG. 2, shown in an after-activation position.

Figure 1:
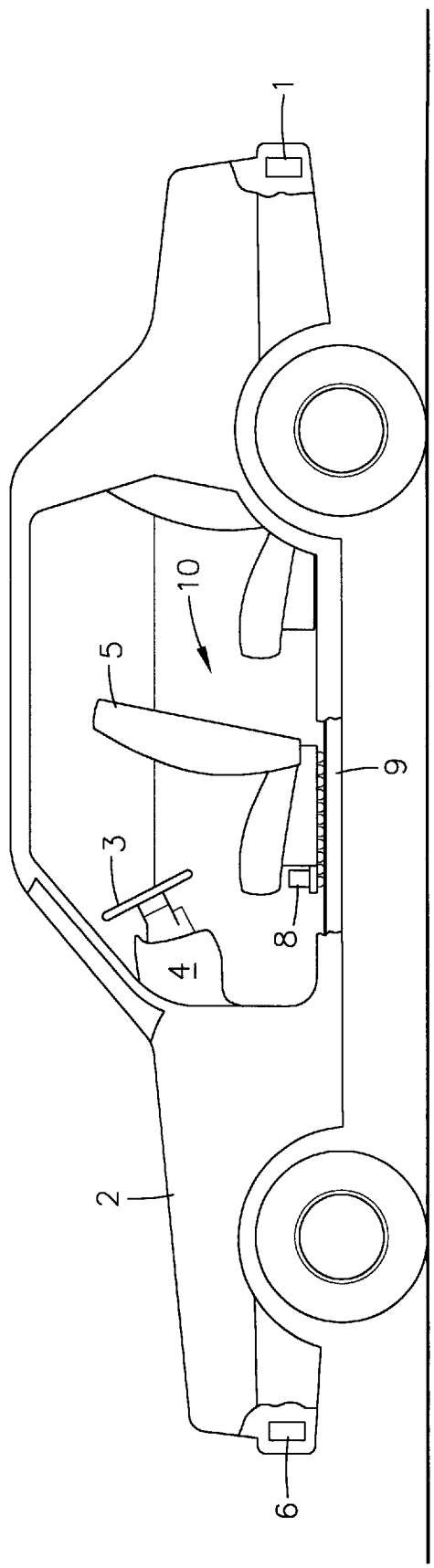
FIG. 1 is an elevation view of one embodiment of the reactive seat system installed in a passenger car.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

In the following paragraphs, the present invention will be described in detail by way of example with reference to the attached drawings.

Definitions

Unless defined otherwise, all technical and scientific terms used herein have the same meaning as is commonly understood by one of skill in the art to which this invention belongs. In event the definition in this section is not consistent with definitions elsewhere, the definitions set forth in this section will control.

As used herein, vehicle can refer to many types of transportation including: aircraft; trains; trolleys; carriages; watercraft including ships, boats and personal watercraft; and automobiles including passenger vehicles, trucks, vans and buses.

As used herein, vehicle collision condition refers to collision of vehicle with another object or a collision about to occur between a vehicle and another object.

General

Throughout this description, the preferred embodiment and examples shown should be considered as exemplars, rather than as limitations on the present invention.

As shown in the drawing for purposes of illustration, a reactive seat system according to the invention moves vehicle occupants away from a vehicle dashboard during or immediately before a collision.

A reactive seat system according to the invention provides a way to prevent vehicle occupant injuries by using a movable seat platform that moves the vehicle occupant away from the dashboard and airbags mounted in the dashboard and steering wheel during a vehicle collision. The reactive seat system is easily integrated into existing vehicles and can be configured to use airbag or other types of sensors.

Structure

Referring to FIG. 1, the reactive seat system in accordance with one embodiment of the invention is illustrated and designated generally by the numeral 10. A vehicle 2 has a conventional steering wheel 3, a dashboard 4 and a vehicle seat 5. Front sensor 6 is mounted in the front area of the vehicle and rear sensor 1 is mounted in the rear area of the vehicle. Airbag system sensors can be used, or other sensors that detect impacts or sudden vehicle accelerations or decelerations. Alternative embodiments may use sensors that can predict imminent vehicle collisions so that the reactive seat system can be triggered immediately prior to a vehicle collision. A mechanical sensor employing a spring mounted in the vehicle bumpers is employed in one embodiment. The spring keeps the reactive seat system from triggering after minor impacts such as those encountered during vehicle parking. The spring absorbs the small bumper deflections resulting from incidental collisions.

Referring to FIG. 2, a seat platform 20 and a chassis platform 21 is mounted to a vehicle chassis 9 underneath the vehicle seat 5. The platforms may be attached directly to the seat, replacing the traditional seat positioning rails, or they may be attached to the seat positioning rails and to the vehicle chassis. In one embodiment, biasing means or propulsive device 8 is mounted to the seat platform 20, as shown in FIGS. 1–3. The propulsive device may be a propellant charge cartridge, an ignitable solid gas generating composition, a pyrotechnic composition or a mechanical spring.

The sensors 1 and 6 are electrically or mechanically connected to the propulsive device 8. In a preferred embodiment airbag sensors are electrically connected to a propellant charge cartridge mounted on the seat platform 20.

Figure 4:
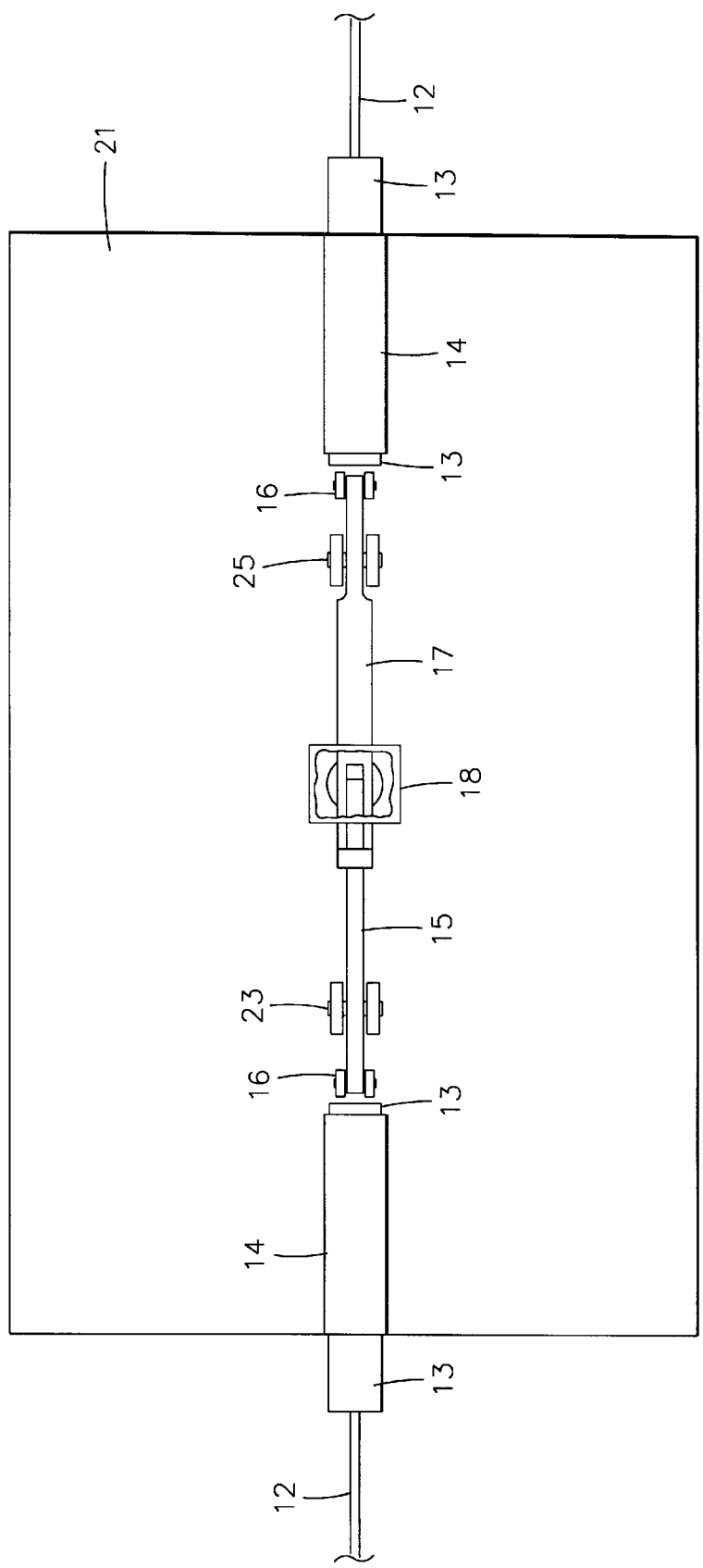
FIG. 4 is a plan view of the chassis platform, trigger housing and related components of the reactive seat system illustrated in FIG. 2.

Referring now to FIGS. 2–4, one embodiment of the reactive seat system is illustrated. Sensors 1 and 6 comprise springs mounted in the front and rear bumpers 11 of vehicle 2. Rods 12 connect the sensors to cam actuators 13 that are positioned in housings 14. In this embodiment the housings attach chassis platform 21 to the vehicle chassis, or frame rail 9. Pivoting cam followers 15 and 17 that pivot about pivot points 23 and 25, respectively, are also located in the housings and have wheels 16 or another suitable type of sliding or rolling surface to engage the cam actuators 13. Both cam followers engage each other in the trigger housing 18 that is also attached to the chassis platform 21. Front cam follower 15 has an L-shaped end, or trigger 19 that sticks up through the chassis platform and into the seat platform 20, locking the seat platform into a fixed position. For activation by the rear sensor 1, rear cam follower 17 has a forked end, shown in FIG. 4, that engages the front cam follower and can pull the trigger 19 downward, releasing the seat platform, as shown in FIG. 3. Biasing spring 24 keeps the trigger firmly engaged with the seat platform 20, and prevents accidental triggering of the reactive seat system.

Seat platform 20 is connected to the chassis platform 21 by roller bearings 22, or other suitable rolling or sliding devices the permit relative movement between the chassis platform and the seat platform. Seat 5 is attached to the seat platform and is used by the vehicle driver or one or more passengers. The seat can be of a bench-type, usually found in trucks, or it can be designed to accommodate only one individual. The reactive seat system can be adapted to fit seats found on any type of vehicle such as aircraft, watercraft or ground vehicles.

Operation

The reactive seat system provides a method for moving a vehicle occupant away from the dashboard during, or immediately prior to, an accident. Front and rear sensors, 1 and 6 respectively, are activated during a vehicle collision. Activation can be based upon collision with an object or from sensing deceleration forces. An alternative embodiment sensor detects collisions that are about to occur and triggers the reactive seat system immediately prior to the collision. This type of sensor could use RADAR, charge-coupled video, or other suitable devices.

Sensors are electrically or mechanically connected to the biasing device 8. In one embodiment the biasing device is a spring but other embodiments the biasing device comprises a propellant charge cartridge, an ignitable solid gas generating composition, a pyrotechnic composition or other suitable devices.

Referring to FIG. 3, when front sensor 6 detects a frontal collision it sends cam actuator 13 into engagement with wheel 16, which pivots cam follower 15 about pivot point 23. The L-shaped end, or trigger 19 of the cam follower pivots down into the trigger housing 18 releasing seat platform 20. Spring 8 is released and pushes seat platform 21 and seat 5, mounted thereon, rearward in the vehicle away from the dashboard 4 preventing the seat occupant from sustaining impact injuries with the dashboard.

Alternative embodiments use airbag sensors to detect the vehicle collision. The airbag sensors are electrically connected to a power apparatus or biasing means mounted on the seat platform 20. As discussed above the power apparatus can be a propellant charge cartridge, an ignitable solid gas generating composition, a pyrotechnic composition or other suitable device.

Other Embodiments

Certain preferred embodiments have been described above. It is to be understood that a latitude of modification and substitution is intended in the foregoing disclosure, and that these modifications and substitutions are within the literal scope—or are equivalent to—the claims that follow.

In some instances, some features of the invention will be employed without a corresponding use of other features. For example, in an embodiment that uses airbag sensors and gas generating power devices, many of the mechanical elements shown in FIGS. 2 and 3 may be removed or modified.

Accordingly, it is appropriate that the following claims be construed broadly and in a manner consistent with the spirit and scope of the invention herein described.

What is claimed is:

1. A reactive vehicle seat system comprising:
   a vehicle chassis having a front end and rear end;
   a seat mounted in said vehicle and moveable between a forward-most position toward the front end of said vehicle and a rearward-most position toward the rear end of the vehicle;
   biasing means biasing said vehicle seat toward said rear end of said vehicle;
   latch means for latching said seat in a selected position between said forward-most and said rearward-most positions in said vehicle; and
   first linkage means including an impact responsive member at the forward end of said vehicle and a first cam member having a caming surface operatively connected to said latch means and responsive to a collision to unlatch said seat thereby enabling said biasing means to move said seat toward the rear end of said vehicle; and
   second linkage means including an impact responsive member at the rear of said vehicle and a second cam member having a caming surface operatively connected to said latch member for releasing said latch member in response to an impact on the rear of said vehicle.

2. A seat system according to claim 1, wherein said first and second cam members are linear cams.

3. A seat system according to claim 1, wherein said first and second cam members operate through a lever to release said latch means.

4. A seat system according to claim 1, said latch means is a linear moveable pin and said first and second cam members engage first and second levers for releasing said latch pin.

5. A seat system according to claim 1, wherein said seat includes a platform mounted by roller bearings for rolling on said chassis vehicle.

6. A seat system according to claim 5, wherein said latch means comprises a pin mounted in said vehicle chassis and extending into said seat chassis.

7. A seat system according to claim 6, wherein said first and second linkage systems include first and second levers operated by each of said respective first and second cam members for moving said latch pin to a released position.

8. A seat system according to claim 7, wherein said first and second cams are linear cams, each engaging an end of one of said first and second levers.

9. A seat system according to claim 8, wherein said biasing means is a linear coiled spring.

10. A method of providing a collision response, the method comprising the steps of:

providing a vehicle chassis having a front end and a rear end;

providing a seat mounted in said vehicle constrained to move linearly toward and from said front end of said vehicle chassis;

providing biasing means connected to said seat assembly for normally biasing said seat toward the rear end of said vehicle;

providing latch means for latching said seat in selected positions against said biasing means; and providing first and second collision-responsive linkage systems, the first collision-responsive linkage system including means responsive to a collision at the front of said vehicle chassis for actuating a first cam member having a caming surface for actuating said latch means for releasing said seat, and second linkage system responsive to a collision at the back of said vehicle for operating a second cam member having a caming surface actuating said latch means for releasing said seat.

11. The method of claim 10, wherein the step of providing the first and second linkage systems includes providing said cams to be linear cams operating to release said latch means.

12. The method of claim 10, wherein providing said linkage systems includes providing said first and second cam means to operates through first and second levers to re-tract a latch pin in said latch means.

* * * * *